United States Patent
Yang et al.

(10) Patent No.: US 11,232,157 B2
(45) Date of Patent: Jan. 25, 2022

(54) PRIVACY-KEPT TEXT COMPARISON METHOD, SYSTEM AND COMPUTER PROGRAM PRODUCT

(71) Applicants: National Tsing Hua University, Hsinchu (TW); National Chiao Tung University, Hsinchu (TW)

(72) Inventors: Lee-Wei Yang, Hsinchu (TW); Jui-Hung Hung, Hsinchu (TW); Emmanuel Oluwatobi Salawu, Hsinchu (TW); Yuan-Yu Chang, Hsinchu (TW)

(73) Assignees: NATIONAL TSING HUA UNIVERSITY, Hsinchu (TW); NATIONAL CHIAO TUNG UNIVERSITY, Hsinchu (TW)

(*) Notice: Subject to any disclaimer, the term of this patent is extended or adjusted under 35 U.S.C. 154(b) by 121 days.

(21) Appl. No.: 16/654,362

(22) Filed: Oct. 16, 2019

(65) Prior Publication Data

US 2021/0019352 A1 Jan. 21, 2021

(30) Foreign Application Priority Data

Jul. 16, 2019 (TW) ................................. 108125145

(51) Int. Cl.
*G06F 17/00* (2019.01)
*G06F 16/903* (2019.01)
(Continued)

(52) U.S. Cl.
CPC ...... *G06F 16/90344* (2019.01); *G06F 16/148* (2019.01); *G06F 16/1794* (2019.01); *G06F 16/9017* (2019.01)

(58) Field of Classification Search
CPC .. G06F 16/90344; G06F 16/13; G06F 16/148; G06F 16/1794; G06F 16/9017
See application file for complete search history.

(56) References Cited

U.S. PATENT DOCUMENTS 7,627,754 B2 * 12/2009 Tsunoda ................. G06F 21/64
713/161
7,734,671 B1 * 6/2010 Ferguson .......... G06F 16/90344
707/753
(Continued)

FOREIGN PATENT DOCUMENTS

CN 102200967 A 9/2011
CN 103049466 B 4/2016
(Continued)

OTHER PUBLICATIONS

Extended European Search Report, dated Sep. 8, 2020, for European Application No. 20182227.7.
(Continued)

*Primary Examiner* — Greta L Robinson
(74) *Attorney, Agent, or Firm* — Birch, Stewart, Kolasch & Birch, LLP

(57) ABSTRACT

A text comparison method is adapted for comparing a query file with an existing file. The text comparison method includes: converting the existing file, by an irreversible method, to obtain a first intermediate file, wherein the first intermediate file includes a plurality of characters, and a number of different characters of the plurality of characters is a predetermined value; receiving a second intermediate file which is a file converted from the query file by the irreversible method; and according to a predetermined string length, comparing the second intermediate file with the first intermediate file by a high repeating-character comparison method to output a comparison result. Therefore, the second intermediate file can be created offline and then only the second intermediate file but not the original query file is submitted through internet for private text comparison.

20 Claims, 7 Drawing Sheets

(51) Int. Cl.
    *G06F 16/14* (2019.01)
    *G06F 16/178* (2019.01)
    *G06F 16/901* (2019.01)

(56) References Cited

U.S. PATENT DOCUMENTS

| | | | |
|---|---|---|---|
| 9,652,601 B2 | 5/2017 | Zheng et al. | |
| 2002/0172425 A1 | 11/2002 | Venkatesan et al. | |
| 2003/0028566 A1* | 2/2003 | Nakano | G06F 16/90344 715/234 |
| 2014/0122509 A1* | 5/2014 | Pantaleoni | G06F 16/90344 707/754 |
| 2015/0331907 A1 | 11/2015 | Bruestle | |
| 2016/0196342 A1 | 7/2016 | Kim et al. | |

FOREIGN PATENT DOCUMENTS

| | | |
|---|---|---|
| CN | 108292307 A | 7/2018 |
| GB | 2483246 A | 3/2012 |
| TW | 201430591 A | 8/2014 |
| TW | I636372 B | 9/2018 |

OTHER PUBLICATIONS

Fernandez, et al., "String Matching in Hardware using the FM-Index," IEEE International Symposium on Field-Programmable Custom Computing Machines (FCCM), May 1, 2011, pp. 218-225, XP031869968.

Langmead, "Introduction to the Burrows-Wheeler Transform and FM Index," Department of Computer Science, JHU, https://web.archive.org/eb/20180328172249if_/http://www.cs.jhu.edu:80/~langmea/resources/bwt_fm.pdf, Nov. 24, 2013, pp. 1-12, XP055725258.

* cited by examiner

PRIVACY-KEPT TEXT COMPARISON METHOD, SYSTEM AND COMPUTER PROGRAM PRODUCT

CROSS-REFERENCE TO RELATED APPLICATION

This non-provisional application claims priority under 35 U.S.C. § 119(a) to Patent Application No. 108125145 in Taiwan, R. O. C. on Jul. 16, 2019, the entire contents of which are hereby incorporated by reference.

BACKGROUND

Technical Field

The present invention relates to a text comparison method, a system and a computer program product, and particularly relates to a text comparison method, a system and a computer program product capable of maintaining privacy.

Related Art

At present, the plagiarism detection service requires a high cost, the database maintenance cost of a plagiarism detection service provider is quite high, and the plagiarism assessment accuracy is relatively low. In addition, if a user wants to use the plagiarism assessment service, the file of the user needs to be transferred to the plagiarism assessment service provider. For confidential data, the user has the concern about the leakage of the confidential data.

SUMMARY

In view of this, some embodiments of the present invention provide a text comparison method, a system and a computer program product capable of maintaining privacy.

According to some embodiments, a text comparison method is adapted for comparing a query file with an existing file. The text comparison method includes: converting the existing, by an irreversible method, file to obtain a first intermediate file, wherein the first intermediate file includes a plurality of characters, and a number of different characters of the plurality of characters is a predetermined value; receiving a second intermediate file which is a file converted from the query file by the irreversible method; and according to a predetermined string length, comparing the second intermediate file with the first intermediate file by a high repeating-character comparison method to output a comparison result. Wherein the term "file" may refer but not limit to: electronic document, soft copy data, copy-and-paste text . . . etc.

According to some embodiments, the irreversible method includes: correspondingly converting each word of the existing file into one of the different characters of the plurality of characters, and integrating corresponding characters to output the first intermediate file, wherein the step of correspondingly converting includes: obtaining a standard code corresponding to the word; obtaining a remainder by dividing the standard code by the predetermined value; and according to the remainder, obtaining the corresponding character from a lookup table.

According to some embodiments, the lookup table includes an index value and the different characters respectively corresponding to each index value, and the index value is an integer from zero to an integer less than the predetermined value.

According to some embodiments, a computer program product includes a set of instructions, and after a computer loads and executes the set of instructions, the text comparison method according to any one of the embodiments of the present invention can be implemented.

According to some embodiments, a file comparison system is adapted for comparing a query file with an existing file. The file comparison system includes a communication module and an operation unit. The operation unit is used for converting the existing file by the irreversible method to obtain a first intermediate file, the first intermediate file includes a plurality of characters, and a number of different characters of the plurality of characters is a predetermined value. According to a predetermined string length, the operation unit is used for comparing a second intermediate file with the first intermediate file by a high repeating-character comparison method to output a comparison result. The communication module is electrically connected to the operation unit. The operation unit is used for receiving the second intermediate file by the communication module, and the second intermediate file is a file converted form the query file by the irreversible method.

Therefore, the second intermediate file can be created offline and then only the second intermediate file but not the original query file is submitted through internet for private text comparison. The objectives, technical contents, features and effects of the present invention are easier to understand by the following specific embodiments in cooperation with accompanying drawings.

DETAILED DESCRIPTION

Figure 1:
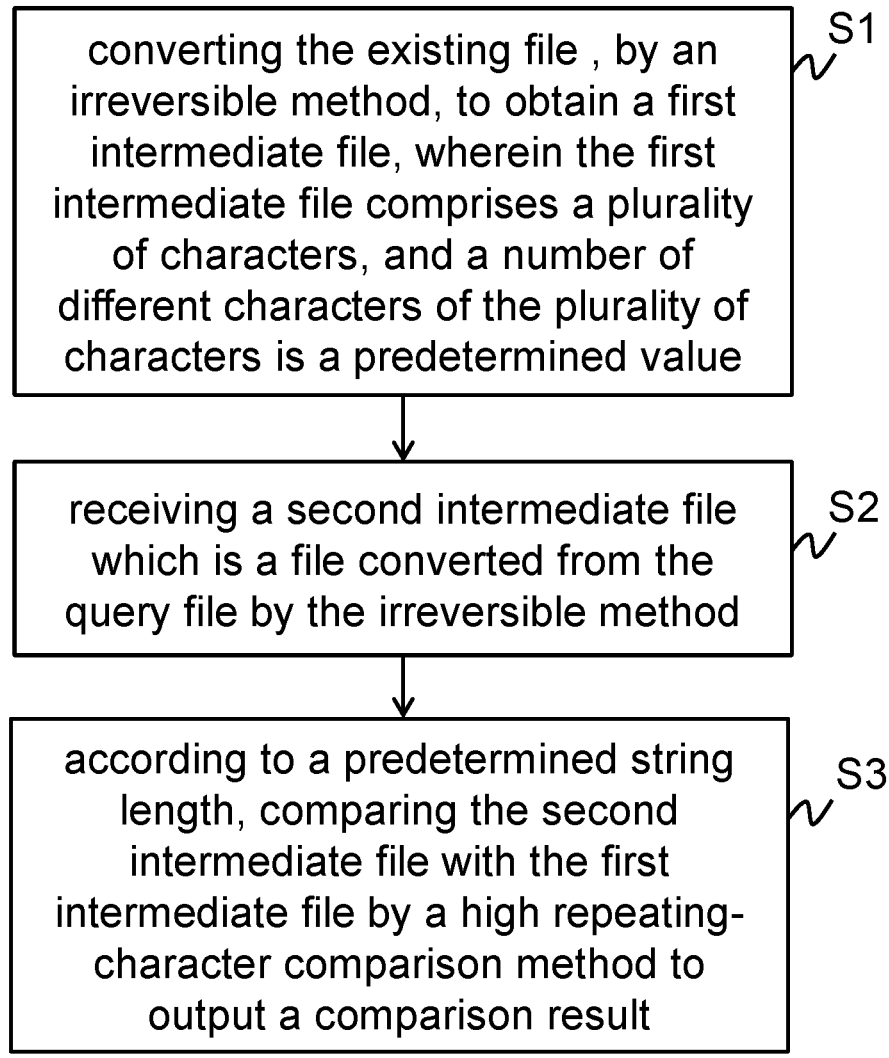
FIG. 1 shows a schematic diagram of steps of a text comparison method according to some embodiments of the present invention.

The embodiments of the present invention are described in detail below with reference to the drawings. In the description of the specification, numerous specific details are provided in order to provide a reader with more complete understanding of the present invention. However, the present invention may be still implemented on the premise that a part of or all of the specific details are omitted. In the drawings, the same or similar elements are represented by the same or similar symbols. It should be noted that the drawings are for illustrative purposes only and do not represent the actual size or number of the element, and in order to simplify the drawings, some details may not be fully drawn.

Referring to FIG. 1, FIG. 1 shows a schematic diagram of steps of a text comparison method according to some embodiments of the present invention. The text comparison method is adapted for comparing a query file with an existing file to judge whether part of the content in the query file is the same as part of the content in the existing file or not. In some embodiments, the text comparison method is applied to plagiarism detection. For example, the query file is a newly completed thesis or article, and the existing file may include one or more disclosed literatures. According to the text comparison method, the query file is compared with the existing file to judge whether the query file copies or plagiarizes the existing file or not. According to the text comparison method, after comparison, a comparison result is output, and the contents of the comparison result are detailed later.

Referring to FIG. 1, according to some embodiments, the text comparison method includes:

step S1: converting the existing file, by an irreversible method, to obtain a first intermediate file, wherein the first intermediate file includes a plurality of characters, and a number of different characters of the plurality of characters is a predetermined value;

step S2: receiving a second intermediate file which is a file form converted from the query file by the irreversible method; and step S3: according to a predetermined string length, comparing the second intermediate file with the first intermediate file by a high repeating-character comparison method to output a comparison result.

The irreversible conversion method in step S1 means that each word in a primary file is converted to output a converted file, and the converted file cannot be decoded back to the primary file. For example, the primary file is an existing file, the existing file includes a plurality of words, the existing file is irreversibly converted to output a first intermediate file, the first intermediate file includes a plurality of characters, and a number of different characters of the plurality of characters is a predetermined value q. For example, the character type can be, but not limited to, a single category or a combination of multiple categories such as alphabets, punctuation marks and special symbols, but the number of used different character types is a predetermined value. For example, A, +, and @ are taken as three number-limited and different character types. For another example, in the irreversible conversion method, each word in the primary file is converted into a character according to a many-to-one function relation (surjective function) to output an intermediate file, wherein the predetermined value q is, but not limited to, the number of character types, such as 4, 6, 8, 12, 16, and 20. In some embodiments, the predetermined value q is 4, and the different q characters are respectively A, T, C, and G. Each character of the intermediate file is selected from the group consisting of the different characters. For example, the content of the intermediate file is ATTAAACCGATTAGGACCC (with four different characters), or AGGGTTAAAGGTTT (only with characters A, T, and G, and without character C). In some embodiments, the above words are individual words or alphabets, and the data volume and standard code of the individual words or the alphabets can be adjusted according to needs.

In some embodiments, the above irreversible conversion method is a standard code remainder method. The standard code remainder method means that the standard code of each word of the primary file before conversion is divided by the above predetermined value q to obtain a remainder, and then, a corresponding character is given according to the remainder. In some embodiments, the above standard code is, but not limited to, an ASCII code (American Standard Code for Information Interchange) or a Chinese commercial code. The standard code (ASCII code) of the word A is 65 (decimal, the same below), the standard code (ASCII code) of the word E is 69, the standard code (ASCII code) of the word T is 84, and the standard code (Chinese commercial code) of the word "楊" is 26954. Taking the situation that the predetermined value q is 4 as an example, the remainder may be 0, 1, 2, or 3, and the character corresponding to each remainder is assumed to correspond to A, T, C, or G respectively. Therefore, the word A of an English primary file is irreversibly converted to obtain the character T, the standard code of the word "楊" of the primary file is divided by the above predetermined value to obtain a remainder 2 which corresponds to the character C, and so on, and the details are omitted. In some embodiments, according to the above standard code remainder method, the standard code of a vocabulary or a word is divided by the predetermined value to obtain a remainder, and then, a corresponding character is obtained. For example, when the word "EAT" in the English primary file is irreversibly converted, the sum of the standard codes of three alphabets E, A, and T included in the word "EAT" is 218, and 218 is divided by the above predetermined value 4 to obtain a remainder 2 which corresponds to the character C.

In some embodiments, the words used in the query file and the existing file are non-English words, such as but not limited to Chinese, Japanese or Korean words. Therefore, when the irreversible conversion method of the standard code remainder method is performed, the standard code is the corresponding standard code of the Chinese, Japanese or Korean word in a computer.

Figure 2:
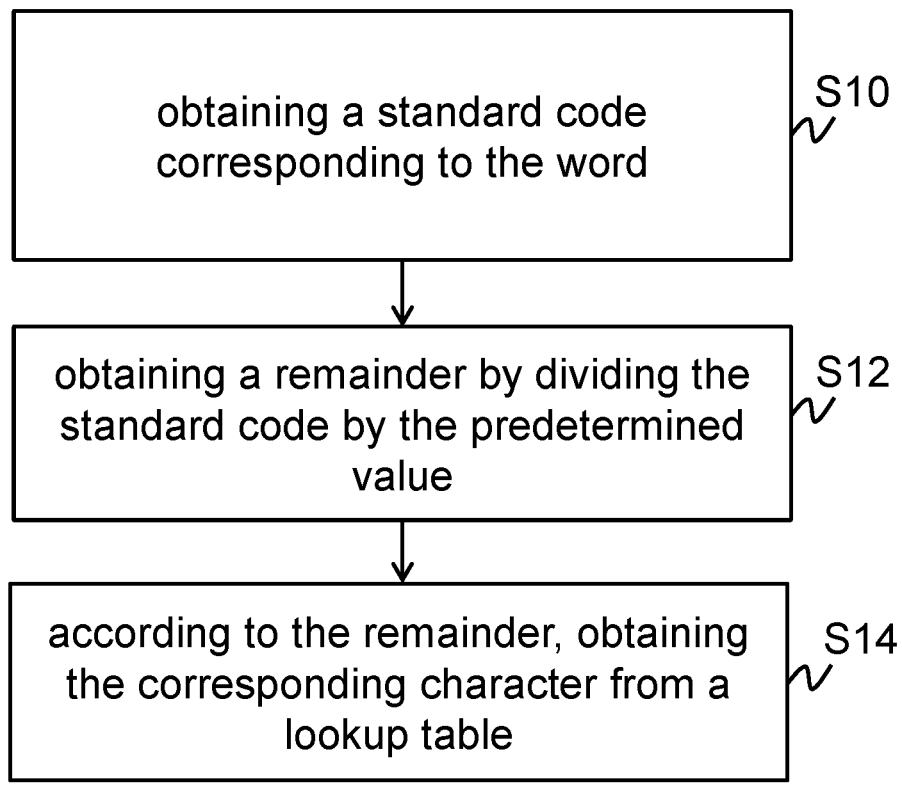
FIG. 2 shows a schematic diagram of steps of a text comparison method according to some embodiments of the present invention.

Specifically, the irreversible conversion method of the above standard code remainder method includes: correspondingly converting each word of the existing file into one of the different characters, and integrating the corresponding characters to output the first intermediate file. Referring to FIG. 2, in an embodiment, the above corresponding conversion includes:

step S10: obtaining a standard code corresponding to a word, wherein if the word includes a plurality of alphabets, the sum of the standard codes of the alphabets serves as, but not limited to, the standard code of the word;

step S12: obtaining a remainder by dividing the standard code by the predetermined value q; and step S14: according to the remainder, obtaining the corresponding character from a lookup table.

The above lookup table may be, but not limited to, a remainder corresponding character lookup table. For example, index values 0, 1, 2, and 3 correspond to A, T, C, and G respectively. In some embodiments, the corresponding relation in the lookup table can be determined by a user or random numbers, so that the conversion is even more irreversible. However, the lookup table in the same text comparison method must be the same. In some embodiments, the lookup table includes an index value and the different characters respectively corresponding to each of the index values, and the index value is an integer from zero to an integer less than the predetermined value. Other embodiments of the irreversible conversion method are described later.

Figure 3:
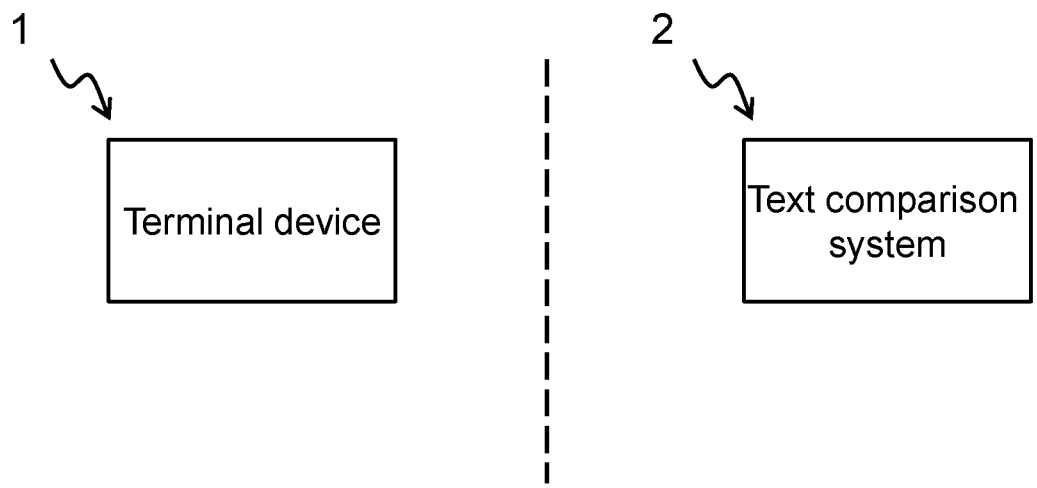
FIG. 3 shows a functional block diagram of a text comparison system according to some embodiments of the present invention.

The receiving in step S2 can be implemented by external transmission through a wireless network or a wired network, or internal reading of a stored data file. Referring to FIG. 3, taking a wireless network transmission mode as an example, a terminal device 1 at a local end irreversibly converts the query file to obtain the second intermediate file, and the terminal device at the local end transfers the second intermediate file to a text comparison system 2 at a server through the Internet, therefore, a hacker cannot obtain a primary query file through the Internet, which can be called as a private receiving mode. Hence, the second intermediate file can be created offline and then only the second intermediate file but not the original query file is submitted through internet for private text comparison. In some embodiments, the text comparison system 2 at the server receives the primary query file transferred by the terminal device 1 at the local end, and the text comparison system 2 irreversibly converts the query file to output the second intermediate file, therefore, in the process of transferring the file by the terminal device 1 through the Internet, the hacker may steal the primary query file through the Internet, which can be called as a public receiving mode. In addition, taking a wired transmission mode as an example, a user can directly transfer the primary query file to the text comparison system 2 by using a portable storage device such as a flash drive. However, the present invention is not limited thereto.

It should be noted that the private receiving mode or the public receiving mode mentioned above refers to whether the primary query file itself is exposed to the risk of being stolen by hackers or search engine providers, but do not refer to whether the second intermediate file is expose to that risk. Even the second intermediate file is illegally stolen by the hacker, the primary content of the query file cannot be decoded due to the effect of the above irreversible conversion method. In other words, the present embodiment implements a private comparison effect through the second intermediate file.

The predetermined string length in step S3 can be, but not limited to, a string consisting of k characters as a length unit. In at least one embodiment, the high repeating-character comparison method implements sequential comparison of character strings with predetermined string length according to the second intermediate file and the first intermediate file to output a comparison result, such as but not limited to a JSON file. For example, the comparison result indicates that there is no same string or at least one hit range for judging whether there is plagiarism or not. Other embodiments of the high repeating-character comparison method are described later.

In some embodiments, if partial contents in the query file plagiarize the existing file, the comparison result includes a first character hit range of the first intermediate file, thereby showing a paragraph having the plagiarized contents in the existing file; and similarly, the comparison result can also include a second character hit range of the second intermediate file, thereby showing a paragraph in which the query file involves plagiarism. That is, the comparison result is at least one of the first character hit range of the first intermediate file and the second character hit range of the second intermediate file. In some embodiments, the text comparison method can preset a plagiarism threshold, such as but not limited to 8, and when the number of continuous same characters in the first intermediate file and the second intermediate file reaches the plagiarism threshold, it is determined as plagiarism. Taking the above intermediate file including $q=12$ types of different characters as an example, the expected value of 16 continuous same characters is $(1/12^{16})=5.4*10^{-16}\%$ which is very small, so it can be reasonably judged as plagiarism. The plagiarism threshold can be determined, for example, according to the number of the characters of the second intermediate file. The design and collocation of the plagiarism threshold and the predetermined value q of the different characters can be modified and transformed by people with usual knowledge, and are not limited to the present embodiment.

Other embodiments of the text comparison method are exemplified below.

In some embodiments, according to the text comparison method, a primary file, such as an existing file or a query file, is irreversibly converted, and then, a location index file (Metafile) is output, wherein the location index file is used for corresponding the location of each character of the converted intermediate file to the location of the corresponding primary text of the primary file. For example, an existing file is irreversibly converted to obtain a first location index file for corresponding the location of each character of the first intermediate file to the location of each word of the existing file, and a query file is irreversibly converted to obtain a second location index file for corresponding the location of each character of the second intermediate file to the location of each word of the query file. Therefore, in some embodiments, the comparison result includes the location corresponding relation between the first character hit range of the first intermediate file and the word hit range of the existing file, and the location corresponding relation between the second character hit range of the second intermediate file and the word hit range of the query file.

In some embodiments, primary files such as an existing file and a query file include a plurality of words. After the text comparison method performs irreversible conversion method, each word is encoded into a corresponding character to output an intermediate file, wherein each character is selected from the group consisting of a plurality of (predetermined value q) characters, and each character is endowed with a corresponding index value, so that a lookup table with index values and corresponding characters can be established, such as shown in table 1. That is, the lookup table includes an index value and the different characters corresponding to respective index values, wherein the index value is an integer from zero to an integer less than the predetermined value q.

TABLE 1

INTEGER_TO_CHAR_MAPPING = \
{0:'A', 1:'R', 2:'N', 3:'D', 4:'C',
5:'Q', 6:'E', 7:'G', 8:'H', 9:'I',
10:'L', 11:'K', 12:'M', 13:'F', 14:'P',
15:'S', 16:'T', 17:'W', 18:'Y', 19:'V'}

TABLE 1-continued

When q=4, {0:'A', 1:'R', 2:'N', 3:'D'} or {0:'A', 1:'T', 2:'C', 3:'G'} are used.
When q=8, {0:'A', 1:'R', 2:'N', 3:'D', 4:'C', 5:'Q', 6:'E', 7:'G'} are used.
When q=16, {0:'A', 1:'R', 2:'N', 3:'D', 4:'C', 5:'Q', 6:'E', 7:'G', 8:'H', 9:'I', 10:'L', 11:'K', 12:'M', 13:'F', 14:'P', 15:'S'} are used.

For example, the number q of different characters is 8, the different characters are respectively A, R, N, D, C, Q, E, and G, and each character of the intermediate file is selected from the group consisting of 8 different characters. For example, the content of the first intermediate file is ARGQNCCGAEAGGADDD (with 8 different characters), or AGGGQQAAAGGNNN (only 4 characters A, N, Q, and G are converted, and other characters are not present yet). Therefore, the intermediate file is a file consisting of fixed number of q characters with high-repeatability, wherein the number q of the different characters is a predetermined value which can be, but not limited to, 4, 6, 8, 12, 16, or 20. For example, when the number q of the different characters is 4, the different characters are respectively A, C, G, and T, and the intermediate file consisting of the different characters has higher character repeatability. Related embodiments of the irreversible conversion method are exemplified below.

In some embodiments, for Western languages, each alphabet respectively corresponds to a standard code (Unicode), such as but not limited to an ASCII code. Therefore, the text comparison method can perform operation of a plurality of standard codes corresponding to a plurality of alphabets included in a word to generate a standard code corresponding to the word. For example, a word x includes n alphabets, $x_i$ represents the ith alphabet in the word x, and ASCII ($x_i$) represents the ASCII code of $x_i$. As mentioned above, the intermediate file includes q different character types. For example, q=8 means that the number of different characters of the plurality of characters is 8. Each character of the intermediate file is selected from the group consisting of 8 different characters, and each character is endowed with a corresponding index value (0-7), so that a lookup table with index values and corresponding characters can be established, such as {0: 'A', 1: 'R', 2: 'N', 3: 'D', 4: 'C', 5: 'Q', 6: 'E', 7: 'G'}. That is, the lookup table includes an index value and the different characters corresponding to respective index values, wherein the index value is an integer from zero to an integer less than the predetermined value q.

PBS_char(x) represents the index value corresponding to the word x, and PBS_char(x) can be, but not limited to, a Char_to_number(x) function. The possible formula is formula (1):

$$\text{PBS\_char}(x) = \text{ROUND}(\Sigma_{i=1 \text{ to } n} \text{Char\_to\_number}(x_i) * g(i)) \mod 8 \quad \text{formula (1)},$$

wherein Char_to_number($x_i$) can be, but not limited to, ASCII ($x_i$), BIG5 ($x_i$), UTF-8 ($x_i$), or Unicode ($x_i$); g(i) can be a constant value or a function of i, including but not limited to simple functions such as i*a+b and a*$i^b$, wherein a is any positive real number, and b is 0 or any positive real number; the ROUND function rounds the number to the nearest integer; and the mod function divides the front and back numbers to obtain a remainder. The remainder obtained by dividing the positive integer before mod by 8 is the index value PBS_char(x) corresponding to the word x, and the corresponding character is obtained according to the index value in the above lookup table. According to the above operation result, PBS_char(x) is a remainder between 0 and 7 as an index value, and respectively corresponds to a character such as A, R, N . . . G. For example, the alphabets e, a, and t included in the English word "eat" respectively correspond to the standard codes 101, 97, and 116 which are substituted into the formula (1) to obtain PBS_char(x)=ROUND($\Sigma_{i=1 \text{ to } 3}$ ASCII($x_i$)*1) mod 8=2, and the corresponding character "N" is obtained through the above lookup table.

However, each word of Eastern languages such as Chinese, Japanese, and Korean respectively corresponds to a standard code. Therefore, the standard code corresponding to each word can be irreversibly converted directly to output an intermediate file. The possible formula is formula (2):

$$\text{PBS\_char}(y) = \text{Char\_to\_number}(y) \mod 8 \quad \text{formula (2)},$$

wherein Char_to_number(y) can be, but not limited to, ASCII (y), BIG5 (y), UTF-8 (y), or Unicode (y); and the remainder obtained by dividing the standard code before mod by the predetermined value (q=8) refers to the above lookup table to obtain the character corresponding to the word y. According to the above operation result, PBS_char (y) is a remainder between 0 and 7 as an index value, and respectively corresponds to a character such as A, R, N . . . G, as described above. For example, the Chinese word "楊" corresponds to the standard code 26954 which is substituted into the formula (2) to obtain PBS_char(y)=ASCII(y) mod 8=2, and the corresponding character "N" is obtained through the above lookup table.

In some embodiments, Eastern and Western languages can utilize other types of many-to-one function relations to share a formula such as formula (3):

$$\text{ROUND}(\Sigma_{i=1 \text{ to } n} \text{nChar\_to\_number}(x_i) * g(i)) \quad \text{formula (3)}.$$

Char_to_number($x_i$) such as an ASCII code of a word is converted from a decimal value to a binary value, then the first three digits are taken as a representative value, and the remainder obtained by dividing the representative value by the predetermined value refers to the above lookup table, so that the character corresponding to the word can be obtained. Taking Chinese as an example, the decimal standard code corresponding to the word "楊" is 26954 which is converted to a binary value expressed as 110100101001010, the first three codes (110) of the highest digits are taken as a representative value, and then, the character "E" of which the index value is 7 can be obtained through the remainder operation and the lookup table. Taking English as an example, the alphabets e, a, and t included in the word "eat" respectively correspond to the standard codes 101, 97, and 116 which are substituted into the formula (3) to obtain a decimal operation result 314, the decimal operation result 314 is converted into a binary value expressed as 100111010, the first three codes (100) of the highest digits are taken as a representative value, and then, the character "C" of which the index value is 5 can be obtained through the remainder operation and the lookup table. However, the present invention is not limited to the above formula.

In some embodiments, Eastern and Western languages can utilize other types of many-to-one function relations to perform corresponding conversion, wherein the corresponding conversion includes: according to the predetermined value, obtaining a bit number; according to the bit number and the standard code, obtaining a representative code; and according to the representative code, obtaining the corresponding character from a lookup table. For example, after a standard code such as an ASCII code of a word is converted from a decimal value to a binary value, according to a predetermined value 4, a bit number 2 is obtained. For another example, when the predetermined value is 8, the bit number is 3; and when the predetermined value is 16, the bit number is 4. After a standard code is converted into a binary value, the bit number of the binary value can be taken from a low bit to a high bit, or from a high bit to a low bit, or from middle bits. Taking Chinese as an example, the decimal standard code corresponding to the word "楊" is converted to a binary value expressed as 110100101001010, the predetermined value is 8, and then, the bit number is 3. If 3 bits are taken from a low bit to a high bit, 010 is obtained as a representative code; if 3 bits are taken from a high bit to a low bit, 110 is obtained as a representative code; and if 3 bits are taken from middle bits, 101 is obtained as a representative code. Finally, a corresponding character is obtained according to the representative code through the lookup table. For example, if the representative code is 010, the character "N" corresponding to the index value 2 can be searched; if the representative code is 110, the character "E" corresponding to the index value 6 can be searched; and if the representative code is 101, the character "Q" corresponding to the index value 5 can be searched. It should be noted that the same corresponding conversion method requires a fixed way to take representative codes and the same lookup table.

Figure 4:
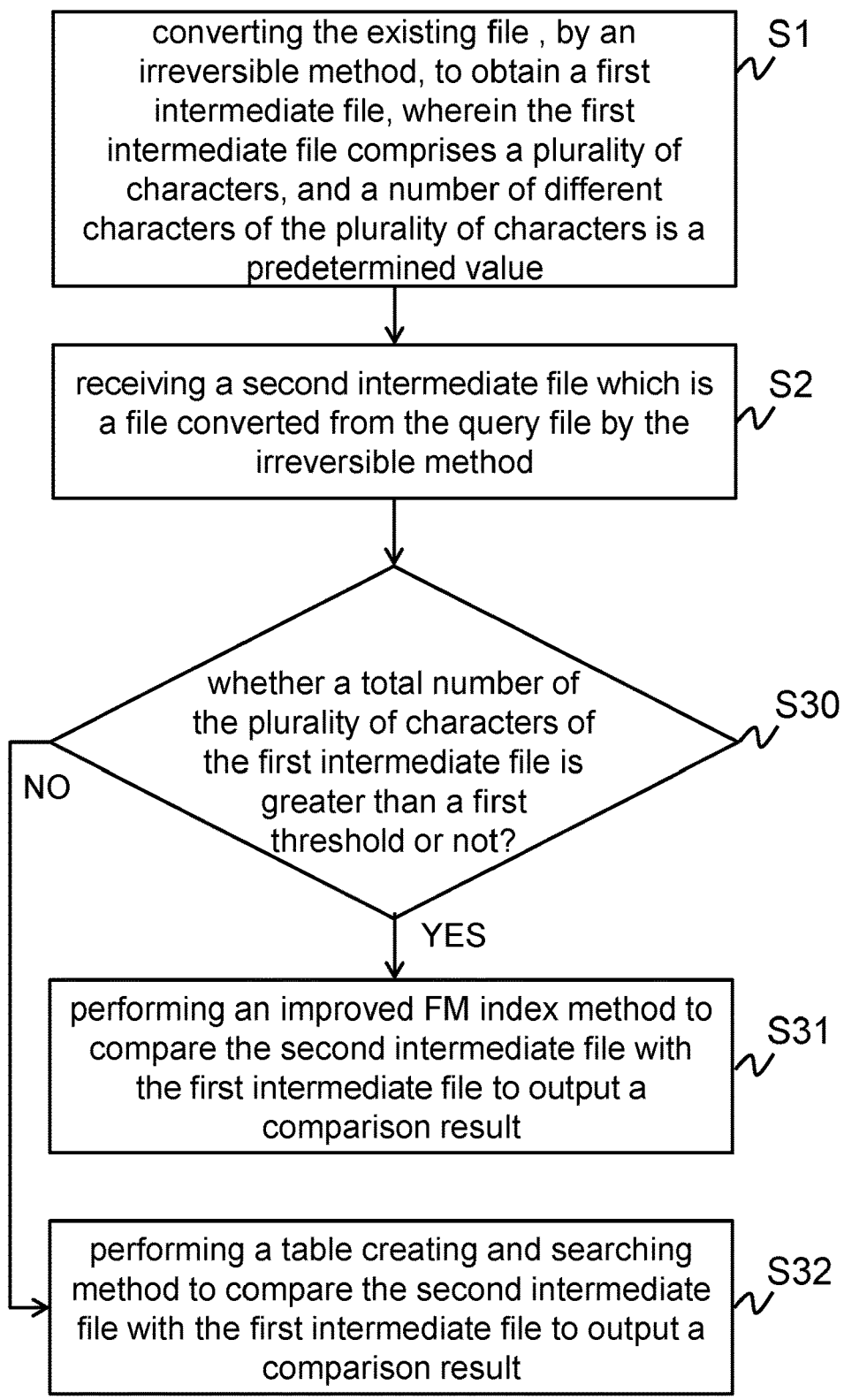
FIG. 4 shows a schematic diagram of steps of a text comparison method according to some embodiments of the present invention.

Referring to FIG. 4, in order to perform optimized fast comparison according to different file data volumes, the high repeating-character comparison method of the present embodiment can be used for realizing step S3 illustrated in FIG. 1, and includes the following steps: step S30, firstly judging whether the total number of a plurality of characters of the first intermediate file is greater than a first threshold or not, wherein the first threshold can be, but not limited to, 8000 characters; step S31, if the total number of the characters is greater than the first threshold, performing an improved FM (Ferragina-Manziniindex, FM-index) index method to compare the second intermediate file with the first intermediate file to output a comparison result; and step S32, if the total number of the characters is not greater than the first threshold, performing a table creating and searching method to compare the second intermediate file with the first intermediate file to output a comparison result.

In some embodiments, the improved FM index method means that an FM index data structure is generated based on block sorting conversion (Burrows-Wheeler Transform, BWT), and characters are detected and searched in at least one first intermediate file with a large data volume. For example, the first intermediate file includes a character sequence "perspective", an identification symbol $ is added to the character sequence, and the orders of characters are sequentially displaced and rotated to generate a plurality of rotation strings, as shown in the Table 2 below. Then, the rotation strings are sorted according to the values in ASCII codes to obtain a rotation table, as shown in the Table 3 below.

TABLE 2

| Original order | Rotation string | Original order | Rotation string |
|---|---|---|---|
| 0 | perspective$ | 6 | ctive$perspe |
| 1 | erspective$p | 7 | tive$perspec |
| 2 | rspective$pe | 8 | ive$perspect |
| 3 | spective$per | 9 | ve$perspecti |

TABLE 2-continued

| Original order | Rotation string | Original order | Rotation string |
|---|---|---|---|
| 4 | pective$pers | 10 | e$perspectiv |
| 5 | ective$persp | 11 | $perspective |

TABLE 3

Rotation table

| | | | | | | | | | | | |
|---|---|---|---|---|---|---|---|---|---|---|---|
| $ | p | e | r | s | p | e | c | t | i | v | e | 11 |
| c | t | i | v | e | $ | p | e | r | s | p | e | 6 |
| e | $ | p | e | r | s | p | e | c | t | i | v | 10 |
| e | c | t | i | v | e | $ | p | e | r | s | p | 5 |
| e | r | s | p | e | c | t | i | v | e | $ | p | 1 |
| i | v | e | $ | p | e | r | s | p | e | c | t | 8 |
| p | e | c | t | i | v | e | $ | p | e | r | s | 4 |
| p | e | r | s | p | e | c | t | i | v | e | $ | 0 |
| r | s | p | e | c | t | i | v | e | $ | p | e | 2 |
| s | p | e | c | t | i | v | e | $ | p | e | r | 3 |
| t | i | v | e | $ | p | e | r | s | p | e | c | 7 |
| v | e | $ | p | e | r | s | p | e | c | t | i | 9 |

Subsequently, according to the rotation table, a counting table, a block sorting compressed string, a sample table, and a location table are generated, respectively as shown in the table 4 to the table 7 below. That is, the simplified FM index data structure of the present embodiment includes a counting table, a block sorting compressed string, a sample table, and a location table, and is adapted for decompressing the first intermediate file. Therefore, the FM index data structure can be utilized in a high repeating-character comparison process to achieve the purposes of effectively compressing intermediate files and quickly searching characters, and has the characteristic of being easily accelerated by the hardware parallel operation.

TABLE 4

Counting table

| Character | $ | c | E | i | p | r | s | t | v |
|---|---|---|---|---|---|---|---|---|---|
| Sorting | 0 | 1 | 2 | 5 | 6 | 8 | 9 | 10 | 11 |

TABLE 5

Block sorting compressed string

| e | e | v | p | P | t | s | $ | e | r | c | i |
|---|---|---|---|---|---|---|---|---|---|---|---|

TABLE 6

Sample table

| | | | |
|---|---|---|---|
| 0 | 3 | 6 | 9 |
| 0 | 0 | 0 | 1 |
| 0 | 0 | 0 | 0 |
| 0 | 2 | 2 | 3 |
| 0 | 0 | 0 | 0 |
| 0 | 0 | 2 | 2 |
| 0 | 0 | 0 | 0 |
| 0 | 0 | 0 | 1 |
| 0 | 0 | 1 | 1 |
| 0 | 1 | 1 | 1 |

TABLE 7

Location table

| 11 | 5 | 4 | 3 |
|---|---|---|---|

Therefore, the improved FM index method is a high-data-volume search method in a compressed state, and has the effects of compressing the data volume and performing fast search to save a memory required by a computer. The improved FM index method specifically includes: according to the characters of the first intermediate file, establishing a simplified FM index data structure through a table creating step; obtaining a plurality of sampled strings according to a plurality of adjacent characters by sliding sampling the character sequence of the second intermediate file for a predetermined string length; and subsequently, comparing whether character strings in the character sequence of the first intermediate file are the same as the above sampled strings or not.

Figure 5:
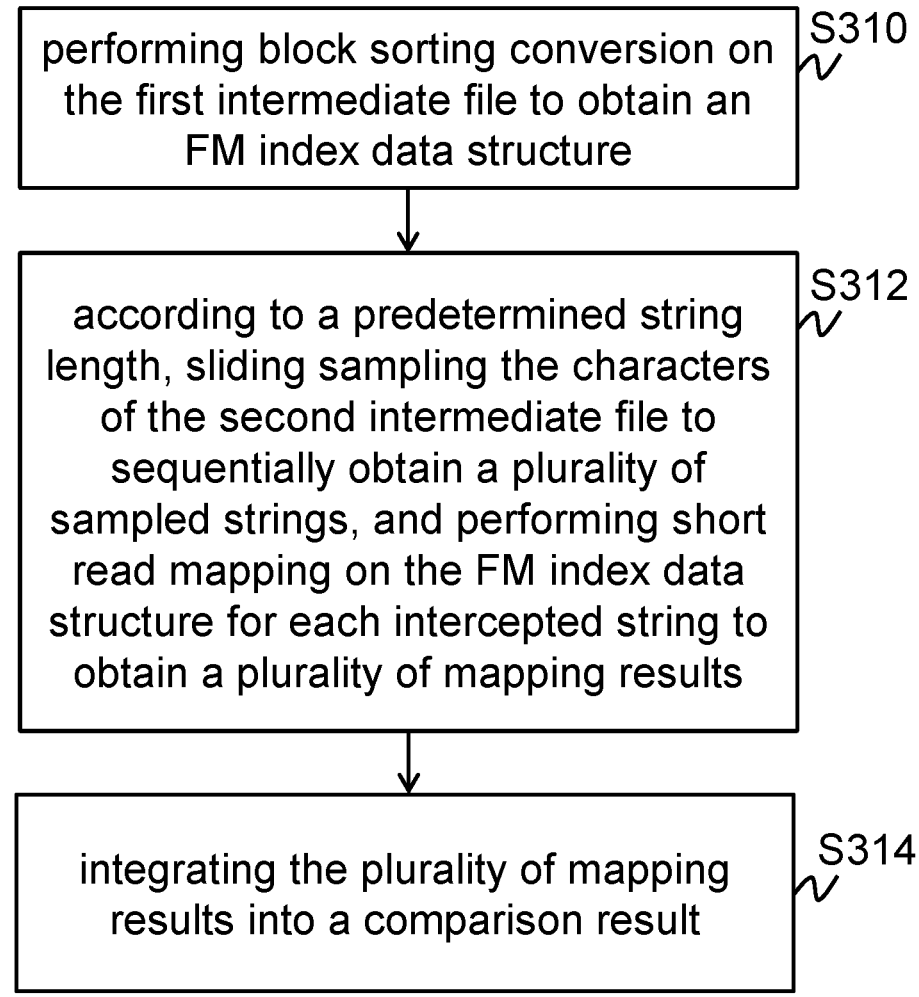
FIG. 5 shows a schematic diagram of steps of a text comparison method according to some embodiments of the present invention.

Referring to FIG. 5, in the present embodiment, the improved FM index method includes the following steps: S310, firstly, performing block sorting conversion on the first intermediate file to obtain an FM index data structure, wherein the block sorting conversion is illustrated above; step S312, according to a predetermined string length, such as but not limited to a character length consisting of 3 continuous characters, sliding sampling the character sequence of the second intermediate file to sequentially obtain adjacent sampled strings, for example, the second intermediate file includes a character sequence ARGQNCC-GAEAGGADDD which can be sequentially sampled to obtain a plurality of sampled strings ARG, RGQ, GQN, . . . , DDD; subsequently, performing short read mapping on the FM index data structure for each sampled string to obtain a plurality of mapping results, for example, a mapping result is a first character hit range for indicating the same character string in the first intermediate file as the sampled string from the second intermediate file; and step S314, then, integrating the plurality of mapping results into a comparison result. Taking the above intermediate file of which the predetermined value q of different characters is 8 as an example, if 10 continuously arranged mapping results show that the content the same as the sampled string consisting of 3 continuous characters in the second intermediate file exists in the first intermediate file, the 10 mapping results are integrated into a comparison result to indicate that there are 12 continuous same characters in the first intermediate file, which achieves the above plagiarism threshold, thereby determining that partial contents of the query file are plagiarized from the existing file, as described above. In some embodiments, the plagiarism threshold is greater than or equal to the predetermined string length.

Figure 6:
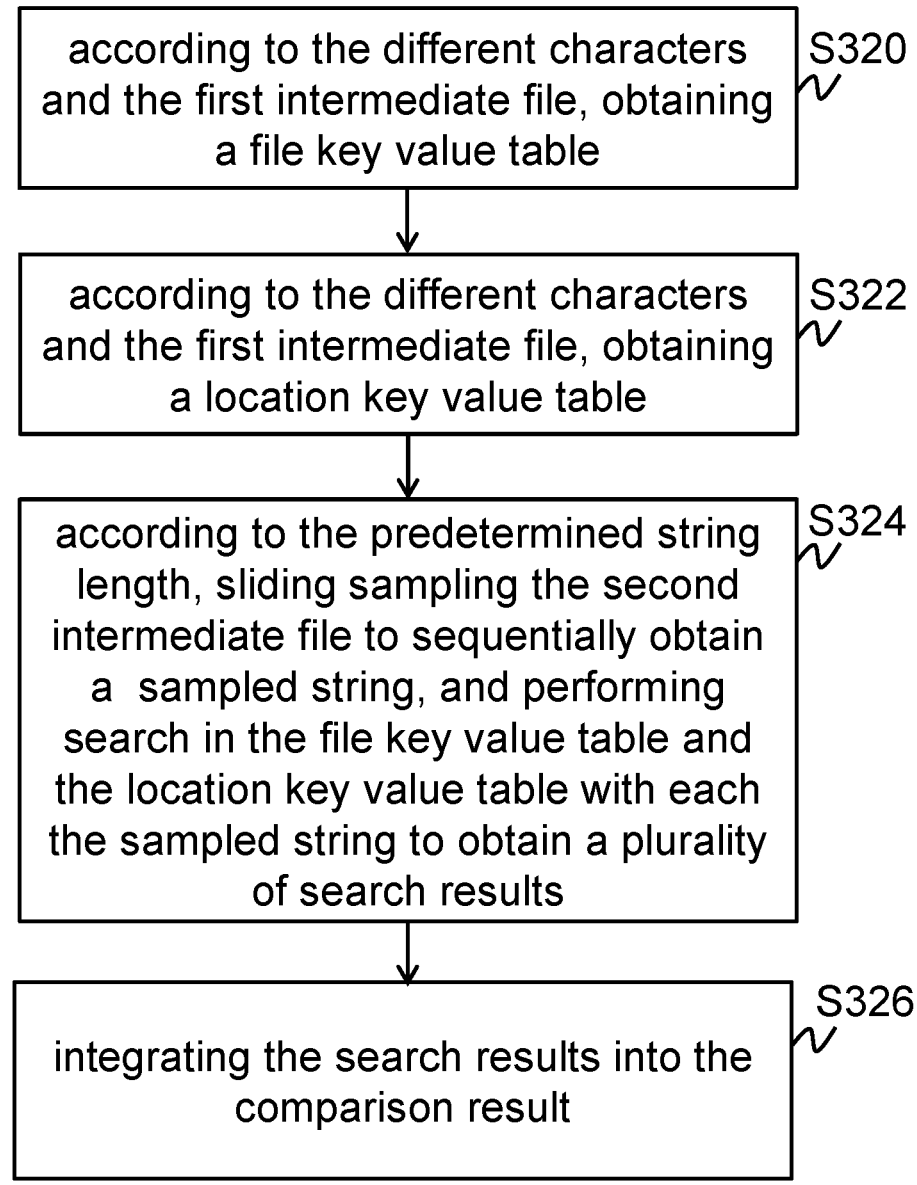
FIG. 6 shows a schematic diagram of steps of a text comparison method according to some embodiments of the present invention.

Referring to FIG. 6, in the present embodiment, for the first intermediate file with a small number of characters, high repeating-character comparison can be performed through a table creating and searching method. Step S320, firstly, arranging and combining q types of different characters into a plurality of character keys, for example, if the predetermined value q of the different characters is 8 and the predetermined string length is 8 continuous same characters, a file key value table establishes a total of $8^8$=16777216 character keys, including $key_1$, $key_2$, . . . , $key_{16777216}$ and other preset fields respectively corresponding to AAAAAAAA, AAAAAAAR, AAAAAAAN, . . . , GGGGGGGG and other character sequences; subsequently, filling the character sequence of the first intermediate file into the corresponding character key field in the file key value table according to 8 continuous characters as a unit, as shown in the table 8 below, so as to establish a file key value table (HashMap1) for subsequent search and comparison, wherein $doc_{12}$, $doc_{201}$, . . . , etc. represent the Nos. of a plurality of first intermediate files.

TABLE 8

HashMap1= {'$key_1$': [$doc_{12}$, $doc_{201}$,...],
'$key_2$': [$doc_{43}$, $doc_{70}$,...],......
'$key_{16777216}$': [$doc_{12}$, $doc_{14}$,...] }

Step S322, according to the different characters and the first intermediate file, obtaining a location key value table (HashMap2), and further recording the location of each character in the first intermediate file for each character key value, as shown in the table 9 below;

TABLE 9

HashMap2 = {'$key_1$': $pos_1$, $pos_{420}$,...],
'key2': [ $pos_4$,...],......
'$key_{16777216}$': [$pos_{12}$, $pos_{14}$,...] }

Step S324, then, according to a predetermined string length, sliding sampling the second intermediate file to sequentially obtain a sampled string, and performing search in the file key value table and the location key value table for each sampled string to obtain a search result, for example, the second intermediate file is sequentially intercepted to obtain a plurality of sampled strings, whether there are character keys having the same character strings in the file key value table or not is compared, one or more corresponding first intermediate files are downloaded to a random access memory (RAM) according to the location key value table, and continuous search is performed to output a character hit range of the first intermediate file as a search result; and step S326, then, integrating a plurality of search results into a comparison result, for example, the character strings corresponding to the search results are integrated, and whether the number of the characters conforms to the plagiarism threshold or not is judged so as to output a comparison result.

Generally speaking, the table creating and searching method includes a table creating step and a table searching step. Firstly, the table creating step includes: according to a plurality of different characters and a first intermediate file, obtaining a file key value table which includes a plurality of character key preset fields, sliding sampling the character sequence of the first intermediate file so as to be filled into the corresponding character key field, and then, according to the plurality of different characters and the first intermediate file, obtaining a location key value table for recording the location of each character in the first intermediate file for each character key value. Secondly, the table searching step includes: according to a predetermined string length, such as but not limited to a string consisting of 3 continuous characters, sliding sampling a second intermediate file to sequentially obtain an sampled string, performing search in the file key value table and the location key value table for each sampled string to obtain a search result, and then, integrating a plurality of search results into the above comparison result. Taking the above intermediate file of which the predetermined value q of different characters is 8 as an example, if 10 continuously arranged search results show that the content the same as the sampled string consisting of 3 continuous characters in the second intermediate file exists in the first intermediate file, the 10 search results are integrated into a comparison result to indicate that there are 12 continuous same characters in the first intermediate file, which achieves the above plagiarism threshold, thereby determining that partial contents of the query file are plagiarized from the existing file, as described above.

According to the above embodiments, the characters of the first or second intermediate file after irreversible conversion method have high repeatability, and the intermediate file cannot be decoded back to the primary file, thereby achieving the effects of high privacy and compressed data volume.

In some embodiments, the step of receiving the second intermediate file includes but not limited to: receiving the query file, and performing irreversible conversion method on the query file to obtain the second intermediate file.

Referring to FIG. 3, FIG. 3 shows a functional block diagram of a text comparison system 2 according to some embodiments of the present invention. The terminal device 1 is, but not limited to, a mobile phone, a tablet computer, a desktop computer, a notebook computer, and a client in a servo system. The text comparison system 2 is, but not limited to, a server in a servo system, a mobile phone, a desktop computer, a notebook computer, and the like. In some embodiments, the text comparison system 2 is a text comparison server. Communication connection is, but not limited to, wired communication or wireless communication. Wired communication adopts, but not limited to, twisted pairs, coaxial cables, optical fibers, and the like. Wireless communication adopts, but not limited to, a wireless local area network (WIFI), a cellular network (3G, 4G), Zigbee, NFC, Bluetooth, and the like. The text comparison system includes the terminal device 1 arranged at the local end and the text comparison system 2 arranged at the server. The terminal device 1 is in communication connection with the text comparison system 2.

In some embodiments, the text comparison method in FIG. 1 can be implemented by the text comparison system 2 in FIG. 3. For example, a user can transfer the existing file and the query file from the terminal device 1 to the text comparison system 2, the text comparison system 2 performs the text comparison method, after comparison by the text comparison system 2, a comparison result is returned to the terminal device 1, and thus, the user can know whether partial contents in the query file are the same as those in the existing file or not according to the comparison result. This implementation mode can be called as a pairwise check mode. In some embodiments, the user transfers the query file from the terminal device 1 to the text comparison system 2, the text comparison system 2 performs text comparison on the query file and the existing file stored in the text comparison system 2, and after comparison by the text comparison system 2, the comparison result is returned to the terminal device 1. In some embodiments, the user transfers the query file from the terminal device 1 to the text comparison system 2, the text comparison system 2 searches and obtains the public data as the existing file through the Internet, then the existing file is compared with the query file, and after comparison by the text comparison system 2, the comparison result is returned to the terminal device 1. This implementation mode can be called as an Internet check mode.

Figure 7:
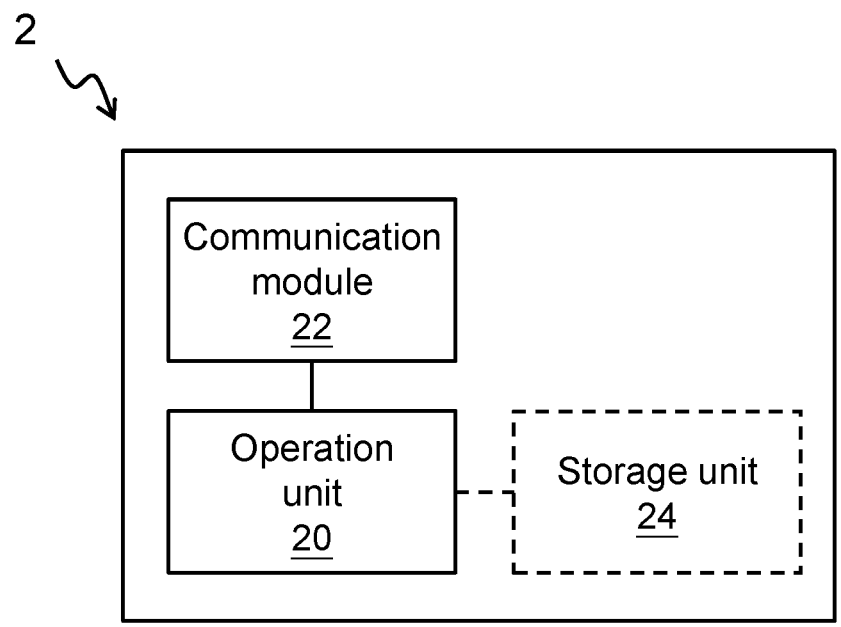
FIG. 7 shows a circuit block diagram of a text comparison system according to some embodiments of the present invention.

Simultaneously referring to FIG. 1 and FIG. 7, the text comparison method in FIG. 1 can be implemented by the text comparison system 2 in FIG. 7. FIG. 7 shows a circuit block diagram of a text comparison system 2 according to some embodiments of the present invention. In the present embodiment, the text comparison method is implemented by a computer program, so that after the computer (namely, any electronic device including an operation unit 20 and a communication module 22, such as the text comparison system 2) loads and performs a program, the text comparison method of any embodiment can be completed.

Based on the above, the text comparison system 2 can be any electronic device including an operation unit 20 and a communication module 22. In some embodiments, the communication module 22 can be a wireless communication interface that establishes a connection with the terminal device 1 from the user through a wireless communication protocol, and the wireless communication protocol is described above. In other embodiments, the communication module 22 can be a wired communication interface and can establish a connection with the terminal device 1 by transmission modes, such as but not limited to twisted pairs, cables, optical fibers and the like, as described above.

The operation unit 20 receives the second intermediate file through the communication module 22, wherein the receiving mechanism and the related technical contents and effects of the second intermediate file are described above.

The operation unit 20 is electrically connected to the communication module 22. In an embodiment, the operation unit 20 can be implemented by one or more of a microprocessor, a microcontroller, a digital signal processor, a microcomputer, a central processing unit, a field programmable gate array, a programmable logic device, a state machine, a logic circuit, an analog circuit, a digital circuit, and/or any processing element that operates signals (analogs and/or digits) based on operation instructions. The operation unit 20 irreversibly converts the existing file to obtain a first intermediate file, wherein the irreversible conversion method and the related calculation mechanism and derived embodiments thereof of the first intermediate file are described above.

According to a predetermined string length, the operation unit 20 is used for comparing the second intermediate file with the first intermediate file by a high repeating-character comparison method to output a comparison result. In some embodiments, the operation unit 20 judges whether the total number of the plurality of characters of the first intermediate file is greater than a first threshold or not so as to perform the improved FM index method or the table creating and searching method, and the second intermediate file is compared with the first intermediate file to output a comparison result. The high repeating-character comparison mechanism performed by the operation unit 20 and the derived embodiments are described above.

In at least one embodiment, the file comparison system 2 selectively includes a storage unit 24. The storage unit 24 is electrically connected to the operation unit 20. In an embodiment, the storage unit 24 can be implemented by one or more memories. The storage unit 24 can be used for storing a plurality of intermediate files, such as a first intermediate file and a second intermediate file, or the storage unit 24 can be used for storing at least one existing file which can be converted into a corresponding first intermediate file.

In some embodiments, the operation unit 20 is adapted for performing irreversible conversion method. The operation unit 20 correspondingly converts each word of an existing file into one of a plurality of different characters, and integrates a plurality of corresponding characters to output a first intermediate file, wherein the operation unit 20 obtains a standard code corresponding to the word, obtains a remainder by dividing the standard code by the predetermined value, and obtains the corresponding character from a lookup table according to the remainder, thereby implementing the above corresponding conversion mechanism.

In some embodiments, the operation unit 20 establishes a lookup table which includes an index value and a plurality of different characters respectively corresponding to each of the index values, and the index value is an integer from zero to an integer less than the predetermined value.

In some embodiments, the operation unit 20 implements the function of high repeating-character comparison, as described above, and the details are omitted herein.

In some embodiments, a computer program product for the text comparison method consisting of a set of instructions. After the computer loads and performs the set of instructions, the text comparison method of any of the above embodiments can be completed.

In conclusion, some embodiments of the present invention provide a text comparison method, a system and a computer program product. Mainly, a primary file including human texts is converted into an intermediate file including fixed quantity of different characters by inconvertible code conversion, wherein the intermediate file is obtained by conversion through a many-to-one function relation calculation method, therefore, a plurality of characters included in the intermediate file have high repeatability, cannot be decoded into the primary file, and have the effects of high privacy and high compressed data volume. Furthermore, the high repeating-character comparison method is used for performing plagiarism detection on the above intermediate file so as to judge whether there is plagiarism or not. When the total number of the characters of the first intermediate file is large, the improved FM index method is performed, so that the amount of memories used during the establishment of an FM index data structure can be greatly reduced, and the effects of compressing a large amount of data and searching characters at relatively low hardware cost and relatively less execution time can be effectively achieved. When the total number of the characters of the first intermediate file is small, the table creating and searching method is performed, so that the plagiarized contents can be quickly searched, and many advantages described above can be realized.

The above embodiments are only used for explaining the technical idea and features of the present invention, and the objective of the present invention is to enable those skilled in the art to understand the contents of the present invention and to implement the present invention, but the scope of the present invention cannot be limited thereto. Equivalent variations or modifications made in accordance with the spirit of the present invention are intended to be included within the scope of the present invention.

What is claimed is:

1. A text comparison method adapted for comparing a query file with an existing file, wherein the text comparison method is implemented by a computer program of a computer or an electronic device, and the text comparison method comprises:
   converting the existing file, by an irreversible method, to obtain a first intermediate file, wherein the first intermediate file comprises a plurality of characters, and a number of different characters of the plurality of characters is a predetermined value;
   receiving a second intermediate file which is a file converted from the query file by the irreversible method; and
   according to a predetermined string length, comparing the second intermediate file with the first intermediate file by a high repeating-character comparison method to output a comparison result.

2. The text comparison method according to claim 1, wherein the irreversible method comprises: correspondingly converting each word of the existing file into one of the different characters of the plurality of characters, and integrating corresponding characters to output the first intermediate file, wherein the step of the correspondingly converting comprises:
   obtaining a standard code corresponding to the word;
   obtaining a remainder by dividing the standard code by the predetermined value; and
   according to the remainder, obtaining the corresponding character from a lookup table.

3. The text comparison method according to claim 2, wherein the lookup table comprises an index value and the different characters respectively corresponding to each the index value, and the index values is an integer from zero to an integer less than the predetermined value.

4. The text comparison method according to claim 3, wherein the high repeating-character comparison method comprises:
   performing block sorting conversion on the first intermediate file to obtain an FM index data structure;
   according to the predetermined string length, sliding sampling the second intermediate file to sequentially obtain a sampled string, and performing short read mapping on the FM index data structure with each the sampled string to obtain a plurality of mapping results; and
   integrating the plurality of mapping results into the comparison result.

5. The text comparison method according to claim 4, wherein the FM index data structure comprises a counting table, a BWT string, a sampling table, and a location table.

6. The text comparison method according to claim 3, wherein the high repeating-character comparison method comprises:
   according to the different characters and the first intermediate file, obtaining a file key value table;
   according to the different characters and the first intermediate file, obtaining a location key value table;
   according to the predetermined string length, sliding sampling the second intermediate file to sequentially obtain an sampled string, and performing search in the file key value table and the location key value table with each of the sampled strings to obtain a plurality of search results; and
   integrating the search results into the comparison result.

7. The text comparison method according to claim 3, wherein the high repeating-character comparison method comprises:
   judging whether a total number of the plurality of characters of the first intermediate file is greater than a first threshold or not, and if the total number of the plurality of characters of the first intermediate file is greater than the first threshold, performing following as:
   performing block sorting conversion on the first intermediate file to obtain an FM index data structure;
   according to the predetermined string length, sliding sampling the second intermediate file to sequentially obtain a sampled string, and performing short read mapping on the FM index data structure with each the sampled string to obtain a plurality of mapping results; and
   integrating the plurality of mapping results into the comparison result; and
   judging whether the total number of the plurality of characters of the first intermediate file is greater than the first threshold or not, and if the total number of the plurality of characters of the first intermediate file is not greater than the first threshold, performing following as:
  according to the different characters and the first intermediate file, obtaining a file key value table;
  according to the different characters and the first intermediate file, obtaining a location key value table;
  according to the predetermined string length, sliding sampling the second intermediate file to sequentially obtain a sampled string, and performing search in the file key value table and the location key value table with each the sampled string to obtain a plurality of search results; and
  integrating the search results into the comparison result.

8. The text comparison method according to claim 1, wherein the step of receiving the second intermediate file comprises:
  receiving the query file; and
  converting the query file by the irreversible method to obtain the second intermediate file.

9. The text comparison method according to claim 1, wherein the existing file is irreversibly converted to obtain a location index file for corresponding the location of each the character of the first intermediate file to the location of each word of the existing file.

10. The text comparison method according to claim 1, wherein the comparison result comprises at least one of a first character hit range of the first intermediate file and a second character hit range of the second intermediate file.

11. The text comparison method according to claim 1, wherein the irreversible method comprises: correspondingly converting each word of the existing file into one of the different characters, and integrating corresponding characters to output the first intermediate file, wherein the step of the correspondingly converting comprises:
  according to the predetermined value, obtaining a bit number;
  according to the bit number and a standard code, obtaining a representative code; and
  according to the representative code, obtaining the corresponding character from a lookup table.

12. A computer program product, comprising a set of instructions, wherein after a computer or an electronic device loads and executes the set of instructions, the computer or the electronic device implements a text comparison method, and the text comparison method comprises:
  converting the existing file, by an irreversible method, to obtain a first intermediate file, wherein the first intermediate file comprises a plurality of characters, and a number of different characters of the plurality of characters is a predetermined value;
  receiving a second intermediate file which is a file converted from the query file by the irreversible method; and
  according to a predetermined string length, comparing the second intermediate file with the first intermediate file by a high repeating-character comparison method to output a comparison result.

13. The computer program product according to claim 12, wherein the irreversible method comprises: correspondingly converting each word of the existing file into one of the different characters of the plurality of characters, and integrating corresponding characters to output the first intermediate file, wherein the step of the correspondingly converting comprises:
  obtaining a standard code corresponding to the word;
  obtaining a remainder by dividing the standard code by the predetermined value; and
  according to the remainder, obtaining the corresponding character from a lookup table.

14. The computer program product according to claim 13, wherein the lookup table comprises an index value and the different characters respectively corresponding to each the index value, and the index values is an integer from zero to an integer less than the predetermined value.

15. The computer program product according to claim 14, wherein the high repeating-character comparison method comprises:
  performing block sorting conversion on the first intermediate file to obtain an FM index data structure;
  according to the predetermined string length, sliding sampling the second intermediate file to sequentially obtain a sampled string, and performing short read mapping on the FM index data structure with each the sampled string to obtain a plurality of mapping results; and
  integrating the plurality of mapping results into the comparison result.

16. The computer program product according to claim 14, wherein the high repeating-character comparison method comprises:
  according to the different characters and the first intermediate file, obtaining a file key value table;
  according to the different characters and the first intermediate file, obtaining a location key value table;
  according to the predetermined string length, sliding sampling the second intermediate file to sequentially obtain an sampled string, and performing search in the file key value table and the location key value table with each of the sampled strings to obtain a plurality of search results; and
  integrating the search results into the comparison result.

17. The computer program product according to claim 14, wherein the high repeating-character comparison method comprises:
  judging whether a total number of the plurality of characters of the first intermediate file is greater than a first threshold or not, and if the total number of the plurality of characters of the first intermediate file is greater than the first threshold, performing following as:
    performing block sorting conversion on the first intermediate file to obtain an FM index data structure;
    according to the predetermined string length, sliding sampling the second intermediate file to sequentially obtain a sampled string, and performing short read mapping on the FM index data structure with each the sampled string to obtain a plurality of mapping results; and
    integrating the plurality of mapping results into the comparison result; and
  judging whether the total number of the plurality of characters of the first intermediate file is greater than the first threshold or not, and if the total number of the plurality of characters of the first intermediate file is not greater than the first threshold, performing following as:
    according to the different characters and the first intermediate file, obtaining a file key value table;
    according to the different characters and the first intermediate file, obtaining a location key value table;
    according to the predetermined string length, sliding sampling the second intermediate file to sequentially obtain a sampled string, and performing search in the file key value table and the location key value table with each the sampled string to obtain a plurality of search results; and integrating the search results into the comparison result.

18. The computer program product according to claim 12, wherein the step of receiving the second intermediate file comprises:

receiving the query file; and converting the query file by the irreversible method to obtain the second intermediate file.

19. The computer program product according to claim 12, wherein the irreversible method comprises: correspondingly converting each word of the existing file into one of the different characters, and integrating corresponding characters to output the first intermediate file, wherein the step of the correspondingly converting comprises:

according to the predetermined value, obtaining a bit number;

according to the bit number and a standard code, obtaining a representative code; and according to the representative code, obtaining the corresponding character from a lookup table.

20. A file comparison system adapted for comparing a query file with an existing file, wherein the file comparison system comprises:

an operation unit, used for converting the existing file by an irreversible method to obtain a first intermediate file, wherein the first intermediate file comprises a plurality of characters, a number of different characters of the plurality of characters is a predetermined value, and according to a predetermined string length, the operation unit is used for comparing a second intermediate file with the first intermediate file by a high repeating-character comparison method to output a comparison result; and a communication module, electrically connected to the operation unit, wherein the operation unit is used for receiving the second intermediate file by the communication module, and the second intermediate file is a file converted form the query file by the irreversible method.

* * * * *